United States Patent [19]

Bruza et al.

[11] Patent Number: 5,134,214

[45] Date of Patent: Jul. 28, 1992

[54] 1,1-SUBSTITUTED ARYLETHYLENES/POLYMALEIMIDE COPOLYMERS

[75] Inventors: Kenneth J. Bruza, Alma; Robert A. Kirchhoff, Midland, both of Mich.

[73] Assignee: The Dow Chemical Company, Midland, Mich.

[21] Appl. No.: 701,433

[22] Filed: May 15, 1991

[51] Int. Cl.$^5$ .................................................. C08F 22/40
[52] U.S. Cl. ................................................................ 526/262
[58] Field of Search .................................................. 526/262

[56] References Cited

U.S. PATENT DOCUMENTS

| | | | |
|---|---|---|---|
| 3,652,726 | 3/1972 | Nield et al. | 525/67 |
| 3,998,786 | 12/1976 | D'Aleilo | 260/47 CP |
| 4,518,754 | 5/1985 | Locatelli et al. | 526/262 |
| 4,564,683 | 1/1986 | Adams et al. | 548/521 |
| 4,609,705 | 9/1986 | Crivello et al. | 524/779 |
| 4,638,078 | 1/1987 | Kirchhoff | 558/414 |
| 4,711,964 | 12/1987 | Tan et al. | 548/461 |
| 4,719,283 | 1/1988 | Bartmann | 528/322 |
| 4,724,260 | 2/1988 | Kirchhoff et al. | 546/112 |
| 4,730,030 | 3/1988 | Hahn et al. | 526/262 |
| 4,731,418 | 3/1988 | Dean | 525/205 |
| 4,745,166 | 5/1988 | Renner et al. | 526/259 |
| 4,826,997 | 5/1989 | Kirchhoff | 548/546 |
| 4,927,907 | 5/1990 | Corley | 528/322 |
| 4,954,583 | 9/1990 | Wang | 525/507 |
| 4,954,584 | 9/1990 | Wang | 525/507 |
| 4,968,754 | 11/1990 | Wong | 525/285 |
| 4,973,636 | 11/1990 | Corley | 526/262 |
| 4,977,223 | 12/1990 | Arnold et al. | 525/432 |

FOREIGN PATENT DOCUMENTS 402975 5/1990 European Pat. Off. .

*Primary Examiner*—Joseph L. Schofer
*Assistant Examiner*—Alex H. Walker
*Attorney, Agent, or Firm*—Michael P. Santorsa; Michael S. Jenkins

[57] ABSTRACT

Copolymers comprising, in polymerized form, a 1,1-substituted arylethylene comonomer and at least one polymaleimide comonomer, are prepared using a system that provides a reduced onset of polymerization temperature thereby allowing removal of the copolymer from the mold after a preliminary curing period followed by transfer to an oven, a less expensive piece of equipment, for additional curing; thus making the mold, a more expensive piece of equipment, available for the next polymerization run.

23 Claims, No Drawings

1,1-SUBSTITUTED ARYLETHYLENES/POLYMALEIMIDE COPOLYMERS

BACKGROUND OF THE INVENTION

This invention relates to polymers prepared from 1,1-substituted arylethylene monomers, and processes for preparing them.

Thermoset resins are compositions which solidify irreversibly upon curing. Such resins are useful in many engineering applications such as coatings, structural laminates, adhesives, films, and composites. Desirable physical properties include enhanced chemical resistance, a high glass transition temperature (hereinafter Tg), high tensile strength, high temperature resistance, electroinsulative or electroconductive properties, and oxidative stability.

Many aerospace manufacturers require that composite materials retain greater than 50 to 60 percent of their strength at 325° F. after being exposed to boiling water for prolonged periods of time.

Bismaleimides are commercially available monomers currently being evaluated as a potential matrix resin for high performance structural composites where excellent thermal and thermooxidative stability are required. Unfortunately, polymers derived from polymaleimides are susceptible to degradation of their physical properties by moisture as well as many common organic solvents. Polymaleimides have good thermal stability but are extremely brittle indicating they have a high degree of crosslinking.

It would be desirable to have new thermoset polymers with improved physical properties or improved combinations of physical properties compared to those of known bismaleimide homopolymers. Some of these properties include enhanced oxidative stability (0% weight loss at 350° C.) and a high Tg (greater than 200° C.). It would be further desirable to have a polymer system with a low polymerization onset temperature thereby allowing removal of the polymer from the mold after a preliminary curing period followed by transfer to an oven, a less expensive piece of equipment, for additional curing; thus making the mold, a more expensive piece of equipment, available for the next polymerization run. It would be still further desirable for such polymer systems to have a polymerization onset temperature lower than about 150° C.

SUMMARY OF THE INVENTION

This invention, in one aspect, is a mixture of monomers comprising at least one polymaleimide and, a 1,1-substituted arylethylene in an amount sufficient to provide a low copolymerization onset temperature (below 150° C.), and a high Tg (greater than 200° C.) in the resulting thermoset copolymer.

In another aspect, this invention is a copolymer comprising, in polymerized form, at least one polymaleimide comonomer and a 1,1-substituted arylethylene comonomer in an amount sufficient to provide a high Tg in the resulting thermoset copolymer.

In still another aspect, this invention is a process for producing said copolymer, comprising combining the monomers to form a mixture under conditions sufficient to form a copolymer. The monomer mixture thermally copolymerizes at a temperature lower than that observed for the polymaleimide alone and yields, in preferred embodiments, copolymers with a high Tg, and enhanced thermal and thermooxidative stability.

One advantage of this low temperature at which copolymerization begins (hereinafter called onset temperature) is the ability to remove the copolymer from the mold after a preliminary curing period, thereby making the mold, an expensive piece of equipment, available for the next polymerization run. Following the preliminary curing period, the polymer can be placed in an oven, a less expensive piece of equipment, for additional curing. These copolymers are useful in many thermoset applications; some of which include composites, coatings, and adhesives.

DETAILED DESCRIPTION OF THE INVENTION

The 1,1-substituted arylethylene monomer suitably employed in this invention is copolymerizable with a polymaleimide. Preferably such monomers correspond to the formula $$\begin{array}{c} CHR \\ \| \\ Ar-C-Y \end{array}$$

wherein
Ar is a monovalent aromatic or heteroaromatic moiety;
R is H or an alkyl moiety containing 1-4 carbon atoms; and
Y is a monovalent aromatic or heteroaromatic moiety, provided that it is a cyclobutarene-containing moiety only when Ar is a cyclobutarene-containing moiety.

Hereinafter these monomers will be called 1,1-monomers.

A cyclobutarene moiety is an aromatic moiety which contains one or more cyclobutanes fused to an aromatic ring, provided that the cyclobutane carbon atoms on the fused side are bonded to adjacent carbon atoms on the same aromatic ring of Ar. Methods of making cyclobutarene precursors are disclosed in U.S. Pat. Nos. 4,562,280 and 4,570,011; herein incorporated by reference. Suitable compounds containing cyclobutarene moieties and methods for their preparation are disclosed in U.S. Pat. Nos. 4,540,763; 4,724,260: 4,831,172; 4,783,514; 4,642,329: 4,743,399: 4,661,193: and 4,812,588, all herein incorporated by reference. Other suitable compounds containing cyclobutarene moieties are prepared as follows.

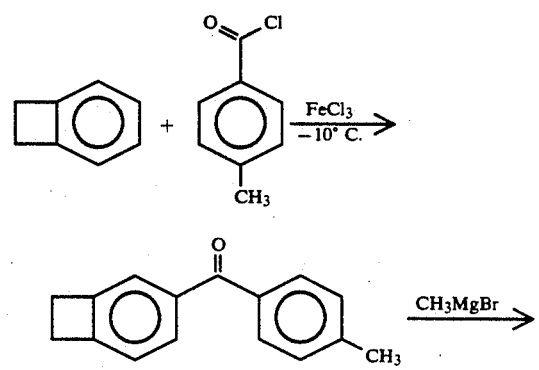

-continued

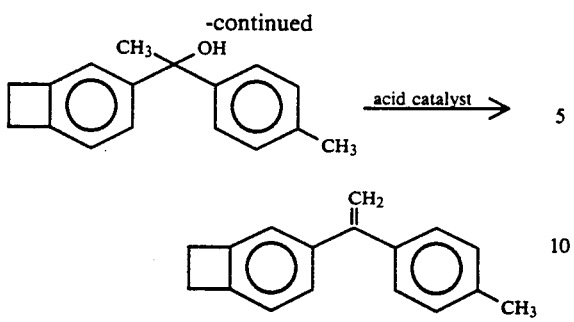

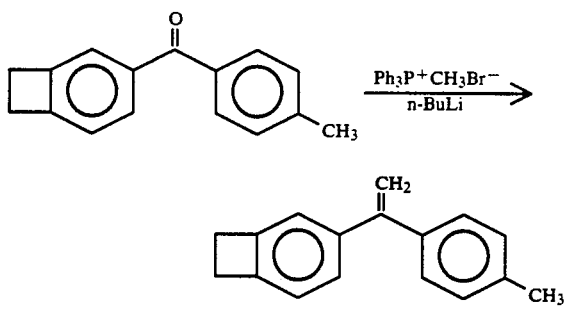

As is shown above, a cyclobutarene is combined with an alkylaromatic acid chloride in the presence of a Friedel Crafts catalyst to yield a diaryl ketone. The diaryl ketone is combined with a Grignard Reagent, such as methylmagnesiumbromide, to provide an alcohol product. Methyllithium can be used in place of the Grignard reagent to obtain the same alcohol product. The alcohol product is combined with an acid catalyst and one molecule of water is eliminated to form 3-(1-(4-methylphenyl)ethenyl)-bicyclo(4.2.0)octa-1,3,5-triene. Suitable acid catalysts include mineral acids, Lewis acids, organic acids, clays, and silicas.

A second possible route for preparing suitable cyclobutarenes is as follows.

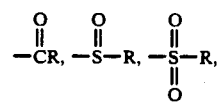

In the above reaction, methyltriphenyl-phosphonium-bromide is combined with n-butyllithium to make an ylid. The ylid reacts with the ketone carbonyl, inserts a $CH_2$ group and simultaneously removes the oxygen, thereby producing 3-(1-(4-methylphenyl)ethenyl)-bicyclo(4.2.0)octa-1,3,5-triene. Preferably, the cyclobutarene moiety is a benzocyclobutane moiety.

Aromatic moieties are carbocyclic or heterocyclic ring compounds containing $(4n+2)\pi$ electrons in an orbital ring as described in Morrison & Boyd, *Organic Chemistry*, 3rd ed., 1973. This property is also known as resonance stabilization or delocalization. Carbocyclic means the aromatic moiety has only carbon atoms in its nucleus. Heterocyclic means the aromatic moiety has atoms other than, and in addition to, carbon in its nucleus; such atoms comprising oxygen, nitrogen, phosphorus, silicon, and sulfur. Suitable aromatic moieties are those derived from benzene, naphthalene, phenanthrene, anthracene, pyridine, biaryl moieties such as (1-methylethylidene)di-4,1-phenylene ester, bicyclo(4.2.0)-octa-1,3,5-triene-3-carboxylic acid; biphenyloxide;

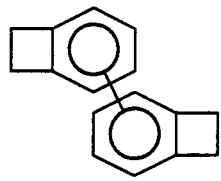

two or more aromatic moieties which are bridged by alkylene or cycloalkylene moieties, and the like. Preferred aromatic moieties are those derived from benzene, naphthalene, biphenyl, binaphthyl, diphenylalkene, cyclobutarene, and diphenylcycloalkene moieties.

More preferred aromatic moieties are those derived from benzene, naphthalene, and biphenyl. The most preferred aromatic moiety is derived from benzene.

The aromatic moiety can be further substituted with a variety of monovalent moieties. Examples of suitable monovalent moieties include $-NO_2$, $-CN$, Br, I, Cl, F, H, $-OH$, $-PR_2$, $-CO_2R$, $-CHO$, $$-\overset{O}{\underset{\|}{C}}R, \quad -\overset{O}{\underset{\|}{S}}-R, \quad -\overset{O}{\underset{\underset{O}{\|}}{\overset{\|}{S}}}-R,$$

hydrocarbyl, hydrocarbyloxy, hydrocarbylthio, $-OR$, $-NHR$, and $-NR_2$, wherein R is H or alkyl. Hydrocarbyl refers to any organic moiety containing only carbon and hydrogen atoms. As used, the term hydrocarbyl means a monovalent hydrocarbon moiety including the following: alkyl, alkenyl, alkynyl, cycloalkyl, cycloalkenyl, cycloalkynyl, aryl, aliphatic and cycloaliphatic aralkyl and alkaryl, and similar hydrocarbon moieties having 1-20 carbons. Aliphatic refers herein to straight- and branched-, saturated and unsaturated, hydrocarbon chains, i.e., alkyl, alkenyl or alkynyl. Cycloaliphatic refers herein to saturated and unsaturated cyclic hydrocarbons, that is, cycloalkenyl, cycloalkynyl, and cycloalkyl. Aryl refers herein to biphenyl, phenyl, naphthyl, phenanthrenyl, anthracenyl and two aryl groups bridged by an alkylene group or heteroatoms such as oxygen and sulfur. Alkaryl refers herein to an alkyl-, alkenyl- or alkynyl-substituted aryl substituent wherein aryl is as defined hereinbefore. Alkenearyl refers herein to a radical which contains at least one alkene portion and one aromatic portion, and includes those radicals in which more than one alkene radical alternates with more than one aryl radical. $C_{1-20}$ alkyl includes straight- and branched-chain methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl moieties. $C_{1-10}$ alkyl includes methyl, ethyl, propyl, butyl, pentyl, hexyl, heptyl, octyl, nonyl, and decyl moieties.

Cycloalkyl refers to alkyl groups containing one or more cycloaliphatic rings. Cycloalkenyl refers to mono- and polycyclic aliphatic groups containing one or more double bonds.

Preferred Y moieties include aryl, and

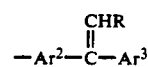

wherein $Ar^2$ and $Ar^3$ are, separately and independently in each occurrence, aromatic or heteroaromatic moieties as hereinbefore defined, and R is as hereinbefore defined.

Suitable 1,1-substituted arylethylene comonomers include the following.

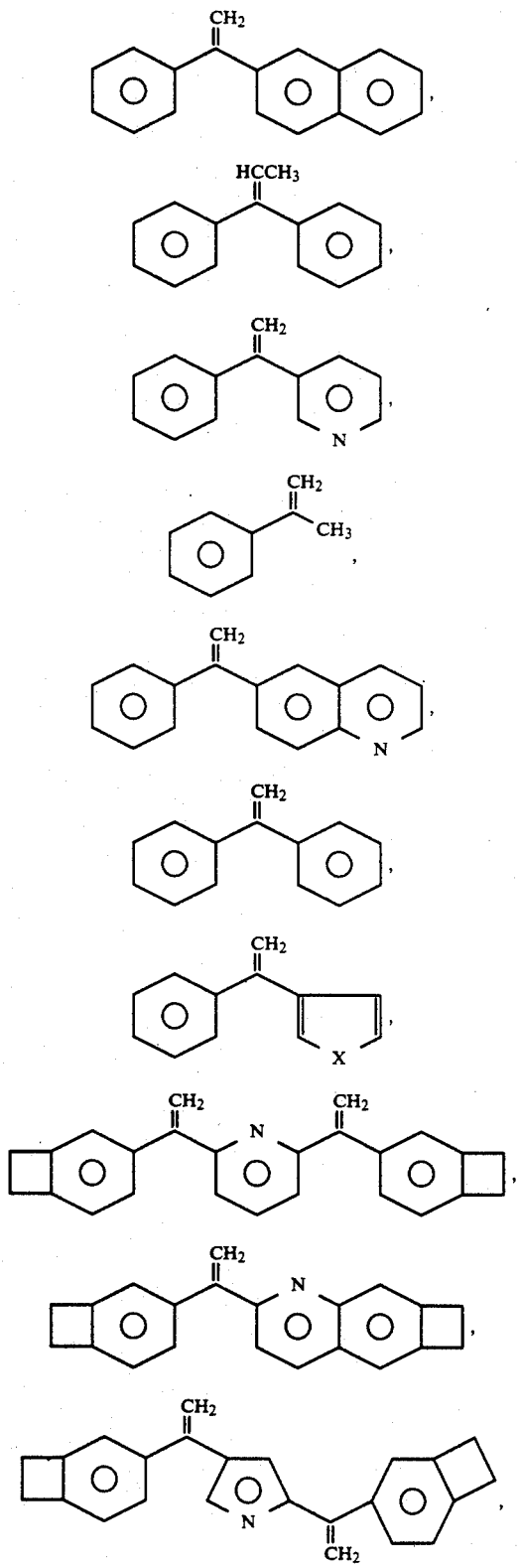

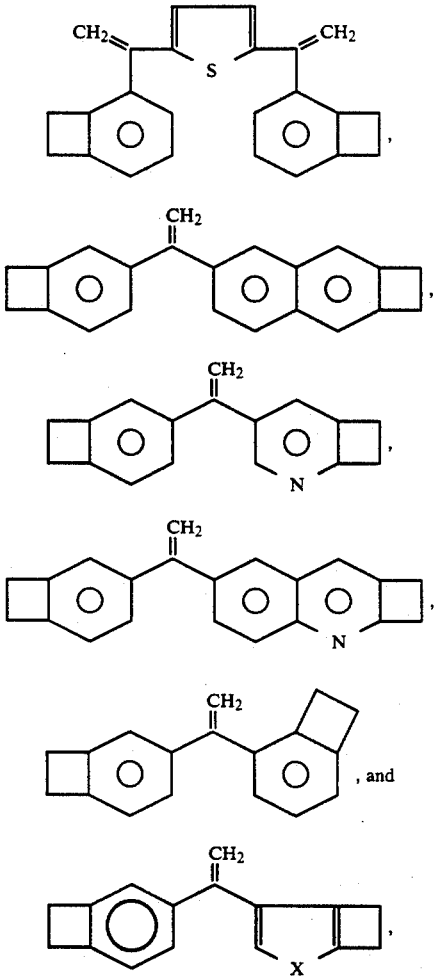

wherein X is O, S, or NR, and R is H or alkyl.

The polymaleimide monomers employed in preparing the polymers of this invention correspond to the formula

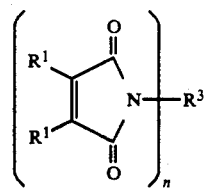

wherein
n is an integer of 2 or greater;
$R^1$ is separately and independently in each occurrence, a monovalent moiety as hereinbefore defined, provided that $R^1$ does not interfere with polymerization; and
$R^3$ is an n-valent bridging member comprising an n-valent organic moiety or heteroatom-containing organic moiety.

The n-valent organic bridging member refers to any organic moiety which can link two (when n=2) or more (when n>2) maleimide radicals. Preferably, the n-valent organic bridging member is a hydrocarbon poly-yl or a heteroatom-containing hydrocarbon poly-yl. Poly-yl refers herein to a polyvalent radical, for example, ar-poly-yl refers to a polyvalent aromatic radical. Poly refers herein to two or more. A heteroatom-containing hydrocarbon poly-yl is a hydrocarbon poly-yl which contains one or more of the heteroatoms comprising oxygen, sulfur, nitrogen, silicon, or phosphorus. The heteroatom in the heteroatom-containing organic species is always removed from the maleimide ring nitrogen by at least one carbon atom. Included within the term hydrocarbon are any organic radicals containing carbon and hydrogen atoms.

More preferred $R^3$ moieties are divalent and represented by the formulae:

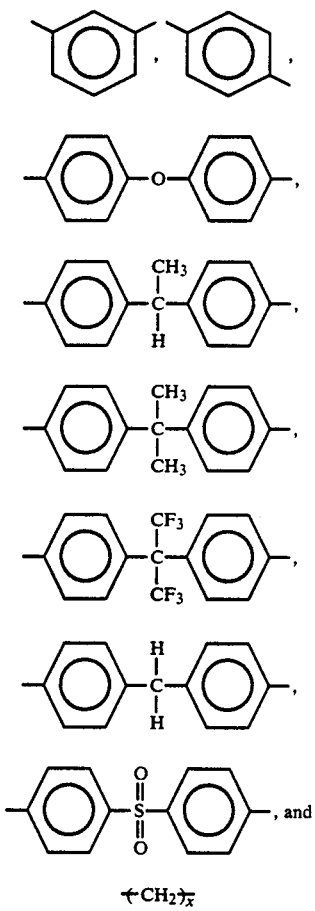

wherein x is at least 1. The most preferred $R^3$ moiety is:

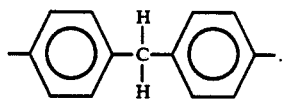

These polymaleimides are dienophilic and react with conjugated dienes to form a six-membered ring. Such dienophiles are discussed in Morrison and Boyd, "Organic Chemistry," 3rd Ed., 1973.

Suitable polymaleimides (hereinafter called PMI co-monomers) include 1,2-bismaleimido ethane, 1,4-bismaleimido butane, 1,6-bismaleimido hexane, 1,12-bismaleimido dodecane, 1,6-bismaleimido-(2,2,4-trimethyl) hexane, 1,3-bismaleimido benzene, 1,4-bismaleimido benzene, 4,4'-bismaleimido diphenyl methane, 4,4'-bismaleimido diphenyl ether, 4,4'-bismaleimido diphenyl sulfide, 4,4'-bismaleimido diphenyl sulfone, 4,4'-bismaleimido dicyclohexyl methane, 2,4-bismaleimido toluene, 2,6-bismaleimido toluene, N,N'-m-xylylene bismaleic imide, N,N'-p-xylylene bismaleic imide, N,N'-m-phenylene-bis-citraconomide, N,N'-4,4'-diphenylmethane-citraconimide, and eutectic blends of bismaleimides such as Kerimid 601 TM, a trademark of Rhone-Poulenc, Compimide 353 TM and Compimide 796 TM, trademarks of Technochemie GMBH, Verfahrenstechnik, a subsidiary of Deutsche Shell AG. The compositions of these three trademarked materials are described in "Engineered Materials Handbook", Vol. 1, p78–89, Composites, ASM International. Methods of preparing such polymaleimides are disclosed in "Polymer", Vol.26, p. 1561, September 1985; U.S. Pat. Nos. 4,745,166; 4,464,520; 4,518,754; 4,711,964; 3,018,290; 4,460,783; 4,564,683; 3,890,272; 4,609,705; 4,288,583; and 4,116,937; all of which are herein incorporated by reference.

In addition to the PMI comonomer and the 1,1-comonomer, some embodiments of the copolymer of this invention contain one or more optional monomers, which can copolymerize with the comonomers and may provide additional cross-linking beyond that which may already exist. A second optional component may increase the pot life of the molten monomer mixture and increase the toughness of the cured resin.

Suitable optional monomers which may provide additional cross-linking include poly(cyclobutarenes) which correspond to the formula

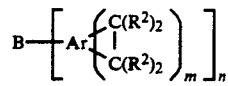

wherein
B is a direct bond or bridging member comprising (1) a polyvalent inorganic radical, or (2) a polyvalent organic radical;
Ar is a polyvalent aromatic or heteroaromatic moiety, an ar-poly-yl, having three or more valences, provided that the carbon atoms of the cyclobutane ring on the fused side are bonded to adjacent carbon atoms on the same aromatic ring of Ar;
n is an integer of 2 or more;
m is an integer of 1 or more; and
R is a monovalent moiety, as hereinbefore defined.
The synthesis and properties of these poly(cyclobutarenes) are described in U.S. Pat. No. 4,540,763; which is herein incorporated by reference.

The preferred optional poly(cyclobutarene) monomers correspond to the formulae:

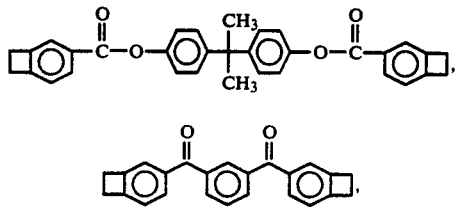

-continued

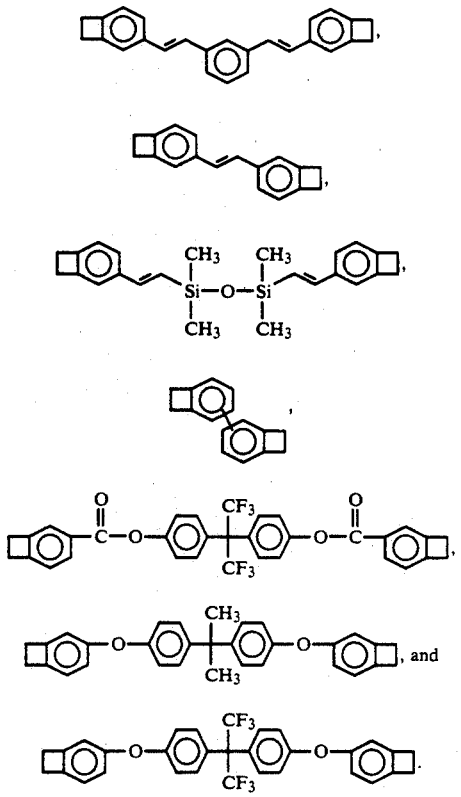

The more preferred optional poly(cyclobutarene) monomers correspond to the formulae:

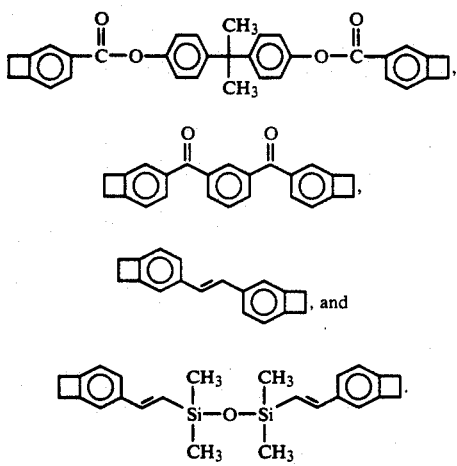

The most preferred optional poly(cyclobutarene) monomer corresponds to the formula:

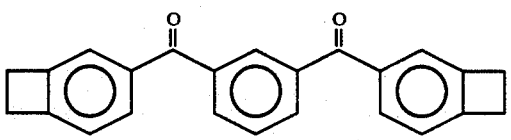

Preferably, the range of the mole ratio of the 1,1-monomer to the optional poly(cyclobutarene) monomer should be an amount sufficient to provide additional cross-linking beyond that which may normally occur in the copolymer of the 1,1-monomer and the PMI. More preferably the range of the mole ratio of the 1,1-monomer to the optional poly(cyclobutarene) monomer component is from about 9:1 to about 150:1, with the most preferred range being about 30:1 to about 150:1.

Suitable optional components which may be added to increase the pot life of the molten monomer mixture and increase the toughness (greater than 30–40 J/m$^2$) of the cured resin include free radical inhibitors such as 2,6-di-tert-butyl-4-methylphenol, tetrakis [methylene (3,5-di-tert-butyl-4-hydroxyhydrocinnamate)]methane, tris (2,4-di-tert-butyl-phenyl)phosphite, thiodiethylene bis-(3,5-di-tert-butyl-4-hydroxy)hydrocinnamate, octadecyl 3,5-di-tert-butyl-4-hydroxy)hydrocinnamate, hydroxy)hydrocinnamate, N,N-diphenyl-p-phenylenediamine, 1,2-dihydro-2,2,4-trimethyldihydroquinoline; triphenylmethane,

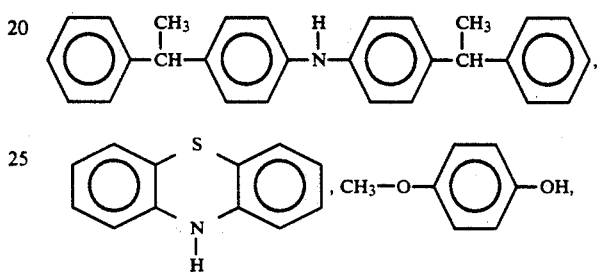

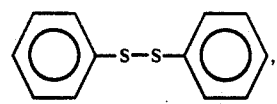

disulfides such as alkylaryl disulfides, dialkyldisulfides, and diaryldisulfides including

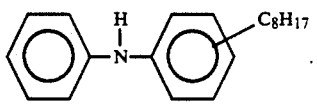

and an isomeric mixture of octylated diphenylamines such as

The most preferred free radical inhibitor is 2,6-di-tert-butyl-4-methylphenol.

Preferably, the range of the mole ratio of the 1,1-monomer to the optional free radical inhibitor component should be an amount sufficient to provide an increased pot life of the molten monomer mixture and increased toughness of the cured resin. More preferably, the range of the mole ratio of the 1,1-monomer to the optional free radical inhibitor component is from about 80:20 to about 99.999:0.001 with the most preferred range being from about 95:5 to about 99.95:0.05.

The amounts of PMI comonomer and 1,1-comonomer employed in preparing the copolymers of this invention can vary. Suitable amounts are those which provide a mixture of monomers that thermally copolymerize, at a temperature lower than that observed for the polymaleimide by itself, to yield copolymers which have a high Tg, enhanced thermal and thermooxidative stability, and are useful in thermoset applications: some of which include, composites, coatings, and adhesives. A preferred mole ratio of polymaleimide to 1,1- monomer is that which provides a low onset temperature, a high Tg and thermal stability, compared to the known polymers of polymaleimides. A more preferred mole ratio range of polymaleimide to 1,1-monomer, is from about 80:20 to about 20:80. The most preferred mole ratio range of polymaleimide to 1,1-monomer is from about 70:30 to about 30:70.

The copolymer composition is prepared by combining the 1,1-comonomer and the PMI comonomer under conditions sufficient to form a copolymer. Application of heat is a preferred polymerization process since the comonomer mixture can thermally polymerize. Preferably such temperatures range from about 120° C. to about 250° C. More preferred temperatures range from about 130° C. to about 180° C. The most preferred temperature is about 150° C. The preferred reaction conditions comprise conducting the polymerization in a nitrogen atmosphere in the absence of solvents or catalysts using the following cure cycle.

130° C. for ½ hour
160° C. for 1 hour
180° C. for 1 hour
200° C. for 1 hour
250° C. for 1 hour.

The mixture of monomers may also be polymerized in the presence of additional optional components which are determined by the particular use of the copolymer. Such optional components include fibrous fillers such as glass, metal, quartz, and graphite: organic and inorganic fillers including polyaramids and polybenzoxazoles: polymerization catalysts, curing agents, and fire retardants. For example, the copolymer composition can contain an amount of an electro-conductive metal such as silver or gold powder and can be used as a die-attach material. In another example, the copolymer composition contains reinforcing glass fibers and can be used as a composite. In a third example, a composite comprises a reinforcing substrate and a copolymer of a polymaleimide and a 1,1-monomer.

The copolymers of this invention have improved physical properties or improved combinations of physical properties compared to PMI homopolymers. For example, low onset temperature, adhesion, thermal stability, oxidative stability, solvent/chemical resistance, Tg, decreased water pick-up, dielectric constant, elongation at break, and toughness may be improved.

Another advantageous property of these copolymers is their excellent long term thermal stability at elevated temperatures. These compositions typically exhibit less than 2.5 percent weight loss when heated in air at 300° C. for 66 hours.

Preferably, the copolymers of this invention have a Tg range of about 250° to about 350° C. More preferably their Tg range is from 300° to about 350° C. The most preferred Tg range is from about 325° to about 350° C.

ILLUSTRATIVE EMBODIMENTS

The following examples are illustrative only, and do not limit the scope of the invention.

Example 1 - COPOLYMER OF 1,1-DIPHENYLETHYLENE WITH 1,1'-[METHYLENEDI-4,1-PHENYLENE]BIS-MALEIMIDE Into a 100 cc flask is weighed 1.0 g (2.79 mmol) of 1,1'-(methylenedi-4,1-phenylene)bismaleimide and 0.25 g (1.39 mmol) of 1,1-diphenylethylene. The monomers are mixed to obtain a homogeneous blend and then transferred to a glass polymerization tube with a nitrogen inlet. The tube is placed in a metal heating bath and the following cure schedule performed.

130° C. for ½ hour
160° C. for 1 hour
200° C. for 1 hour
250° C. for 2 hours

At the completion of the 160° C. cycle, the copolymer is a solid At this point, if a production mold were being used, the copolymer could be removed from the mold and placed in an oven for the remainder of the cure schedule. At the completion of the schedule, the tube is removed from the heating bath and rapidly cooled to room temperature. A light amber cylindrical mass of polymer weighing 1.19 g, which equals 95.2% mass recovery, is removed from the tube. Thermal Gravimetric Analysis of the copolymer in a nitrogen atmosphere using a DuPont Model 951 Thermogravimetric Analyzer shows a 1% weight loss at 363° C. and a 5% weight loss at 414° C. The coefficient of thermal expansion, measured from 30° C. to 320° C. in increments of 10° C. using a DuPont Model 943 Thermalmechanical Analyzer is 79.4 ppm/° C. The glass transition temperature, measured under nitrogen using a DuPont Model 943 Thermalmechanical Analyzer, is 235° C.

Example 2 - COPOLYMER OF 1,1-DIPHENYLETHYLENE WITH 1,1'-[METHYLENEDI-4,1-PHENYLENE]BIS-MALEIMIDE AND 2,6-DI-TERT-BUTYL-4-METHYLPHENOL Into a glass vessel is placed 0.360 g (1.005 mmol) of 1,1'-(methylenedi-4,1-phenylene)bismaleimide, 0.181 g (1.005 mmol) of 1,1-diphenylethylene, and 0.044 g (0.20 mmol) of 2,6-di-tert-butyl-4-methylphenol. The contents of the vessel are mixed to form a homogeneous blend. Differential Scanning Calorimetry analysis of the blend from room temperature to 300° C. at 20° C. per minute using a DuPont Model 910 Differential Scanning Calorimeter shows a bimodal endotherm at 128.33° C. and 136.59° C., an onset of polymerization at 150° C., followed by an exotherm centered at 194.82° C. The sample is cooled to room temperature and then reanalyzed. Upon reanalysis the endothermic and exothermic transitions are absent and there is no clearly defined Tg below 380° C.

Example 3 - COPOLYMER OF ALPHA-METHYLSTYRENE WITH 1,1'-[METHYLENEDI-4,1-PHENYLENE]BIS-MALEIMIDE Into a glass vessel is placed 0.360 g (1.005 mmol) of 1,1'-(methylenedi-4,1-phenylene)bismaleimide and 0.119 g (1.008 mmol) of alpha-methylstyrene. When mixed, they form a homogeneous, tacky, yellow solid. Differential Scanning Calorimetry analysis of the mixture from room temperature to 300° C. at 20° C. per minute using a DuPont Model 910 Differential Scanning Calorimeter shows an endotherm centered at 123.09° C., an onset of polymerization at 131° C., immediately followed by a large exotherm of 313.6 joules per gram centered at 149.55° C. The sample is cooled to room temperature and when reanalyzed using the same program, the endothermic and exothermic transitions are absent and there is no clearly defined Tg below 300° C. After reanalysis, the polymer is a clear, pale yellow solid. Example 4 - COPOLYMER OF 3,3'-(1,3-

PHENYLENEDIETHENYLIDENE)BIS-BICY-
CLO(4.2.0)OCTA-1,3,5-TRIENE WITH 1,1'-[ME-
THYLENEDI-4,1-PHENYLENE]BISMALEIMIDE

Into a glass vessel is placed 0.050 g (0.1395 mmol) of 1,1'-(methylenedi-4,1-phenylene)bismaleimide and 0.040 g (0.1197 mmol) of 3,3'-(1,3-phenylenediethenylidene)bis-bicyclo(4.2.0)octa-1,3,5-triene. When mixed, they form a tacky yellow solid. Differential Scanning Calorimetry analysis of the mixture from room temperature to 400° C. at 10° C. per minute using a DuPont Model 910 Differential Scanning Calorimeter shows an onset of polymerization at 145° C. and a small exotherm centered at 163.64° C. A second exotherm is observed at 254.83° C. followed by a small exotherm centered at 309.14° C. The sample is cooled to room temperature and when reanalyzed using the same program, the endothermic and exothermic transitions are absent and there is no clearly defined Tg up to 400° C.

Example 5 - COPOLYMER OF
3,3'-(1,3-PHENYLENEDIETHENYLIDENE)BIS-
BICYCLO(4.2.0)OCTA-1,3,5-TRIENE WITH
1,1'-[METHYLENEDI-4,1-PHENYLENE]BIS-
MALEIMIDE AND
2,6-DI-TERT-BUTYL-4-METHYLPHENOL Into a glass vessel is placed 0.136 g (0.3795 mmol) of 1,1'-(methylenedi-4,1-phenylene)bismaleimide, 0.127 g (0.3799 mmol) of 3,3'-(1,3-phenylenediethenylidene)bis-bicyclo(4.2.0)octa-1,3,5-triene, and 0.002 g (0.00908 mmol) of 2,6-di-tert-butyl-4-methylphenol. When mixed, they form a homogeneous, tacky, yellow solid. Differential Scanning Calorimetry analysis of the mixture from room temperature to 400° C. at 20° C. per minute using a DuPont Model 910 Differential Scanning Calorimeter shows an endotherm centered at 142 12° C., an onset of polymerization at 145° C., followed by a large exotherm centered at 179° C. A second exotherm is centered at 264.16° C. The sample is cooled to room temperature and when reanalyzed using the same program, the endothermic and exothermic transitions are absent and there is no clearly defined Tg below 300° C. Following reanalysis, the sample is a clear light yellow brittle solid.

What is claimed is:

1. A copolymerizable mixture of monomers comprising
   (1) at least one polymaleimide, represented by the formula:

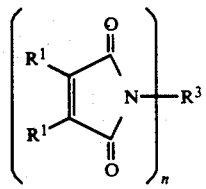

wherein
   n is an integer of 2 or greater;
   $R^1$ is separately and independently in each occurrence, a monovalent moiety: and
   $R^3$ is an n-valent bridging member comprising an n-valent organic or heteroatom-containing organic moiety: and
   (2) a 1,1-substituted arylethylene represented by the formula:

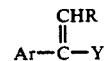

wherein
   Ar is an aromatic or heteroaromatic moiety;
   R is H or an alkyl moiety containing 1-4 carbon atoms; and
   Y is an aromatic or heteroaromatic moiety provided that Y is a cyclobutarene-containing moiety only when Ar is a cyclobutarene-containing moiety,
   in an amount sufficient to provide a copolymerization onset temperature below 200° C.

2. The mixture of claim 1 wherein said 1,1-substituted arylethylene is present in a mole ratio range of polymaleimide to 1,1-substituted arylethylene of about 70:30 to about 30:70.

3. The mixture of claim 1 wherein an optional poly(cyclobutarene) monomer is added in an amount sufficient to provide crosslinking beyond that present in the mixture of claim 1.

4. The mixture of claim 2 comprising an optional poly(cyclobutarene) monomer in a mole ratio range of about 1:30 to about 1:150 of the optional poly(cyclobutarene) monomer to the 1,1-substituted arylethylene.

5. The mixture of claim 2 comprising an optional free radical inhibitor in a mole ratio range of about 5:95 to about 0.05:99.95 of the optional free radical inhibitor component to the 1,1-substituted arylethylene.

6. The mixture of claim 4 comprising an optional free radical inhibitor in a mole ratio range of about 5:95 to about 0.05:99.95 to the optional free radical inhibitor component to the 1,1-substituted arylethylene.

7. A copolymer comprising in copolymerized form
   (1) at least one polymaleimide, represented by the formula:

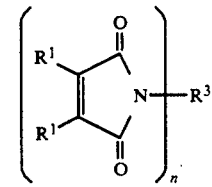

wherein
   n is an integer of 2 or greater;
   $R^1$ is separately and independently in each occurrence, a monovalent moiety;
   $R^3$ is an n-valent bridging member comprising an n-valent organic or heteroatom-containing organic moiety and
   (2) a 1,1-substituted arylethylene represented by the formula:

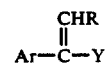

wherein
   Ar is an aromatic or heteroaromatic moiety;
   R is H or an alkyl moiety containing 1-4 carbon atoms; and Y is an aromatic or heteroaromatic moiety provided that Y is a cyclobutarene-containing moiety only when Ar is a cyclobutarene-containing moiety, in an amount sufficient to provide a polymerization onset temperature below 200° C.

8. The copolymer of claim 7 wherein an optional poly(cyclobutarene) monomer is added in an amount sufficient to provide crosslinking beyond that present in the copolymer of claim 7.

9. The copolymer of claim 7 comprising an optional poly(cyclobutarene) monomer in a mole ratio range of about 1:30 to about 1:150 of the optional poly(cyclobutarene) monomer to the 1,1-substituted arylethylene.

10. The copolymer of claim 7 comprising an optional free radical inhibitor in a mole ratio range of about 5:95 to about 0.05:99.95 of the optional free radical inhibitor component to the 1,1-substituted arylethylene.

11. The copolymer of claim 8 comprising an optional free radical inhibitor in a mole ratio range of about 5:95 to about 0.05:99.95 of the optional free radical inhibitor component to the 1,1-substituted arylethylene.

12. The copolymer of claim 7 wherein Y is

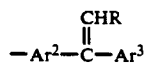

wherein

Ar$^2$ and Ar$^3$ are aromatic or heteroaromatic moieties: and

R is H or an alkyl moiety containing 1-4 carbon atoms.

13. The copolymer of claim 7 wherein said n-valent organic bridging member is

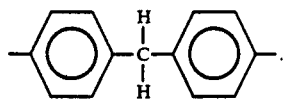

14. The copolymer of claim 7 wherein the polymaleimide is 1,1'-(methylenedi-4,1-phenylene)bismaleimide and the 1,1-substituted arylethylene is 1,1-diphenylethylene.

15. The copolymer of claim 7 wherein the polymaleimide is 1,1'-(methylenedi-4,1-phenylene)bismaleimide and the 1,1-substituted arylethylene is alpha-methylstryene.

16. The copolymer of claim 12 wherein the polymaleimide is 1,1'-(methylenedi-4,1-phenylene)bismaleimide and the 1,1-substituted arylethylene is 3,3'-(1,3-phenylenediethenylidene)bis-bicyclo(4.2.0)octa-1,3,5-triene.

17. The copolymer of claim 10 wherein the polymaleimide is 1,1'-(methylenedi-4,1-phenylene)bismaleimide; the 1,1-substituted arylethylene is 1,1-diphenylethylene; and the free radical inhibitor is 2,6-di-tert-butyl-4-methylphenol.

18. The copolymer of claim 10 wherein the polymaleimide is 1,1'-(methylenedi-4,1-phenylene)bismaleimide; the 1,1-substituted arylethylene is 3,3'-(1,3-phenylenediethenylidene)bis-bicyclo(4.2.0)octa-1,3,5-triene; and the free radical inhibitor is 2,6-di-tert-butyl-4-methylphenol.

19. A process for producing the copolymer of claim 7 comprising combining said (1) and (2) of claim 7 under conditions sufficient to form the copolymer.

20. The copolymer of claim 7 which contains an optional component is dispersed in the copolymer in an amount sufficient to provide reinforcement to the copolymer.

21. The copolymer of claim 20 wherein said optional component is selected from the group consisting of: glass, metal, quartz, and graphite fibers, organic and inorganic fillers, catalysts, curing agents, and fire retardants.

22. The copolymer of claim 21 wherein said organic filler is a polyaramid or a polybenzoxazole.

23. The process of claim 19 wherein the combining under conditions sufficient to form a copolymer is carried out in contact with a reinforcing substrate.

* * * * *